April 5, 1966  P. R. ANDERSON ETAL  3,244,091
WEDGE PRESS AND TRUSS MAKING MACHINE
Filed Sept. 4, 1964  6 Sheets-Sheet 1

INVENTORS
Philip R. Anderson,
Peter Vozzo
BY Stevens, Davis, Miller & Mosher
ATTORNEYS

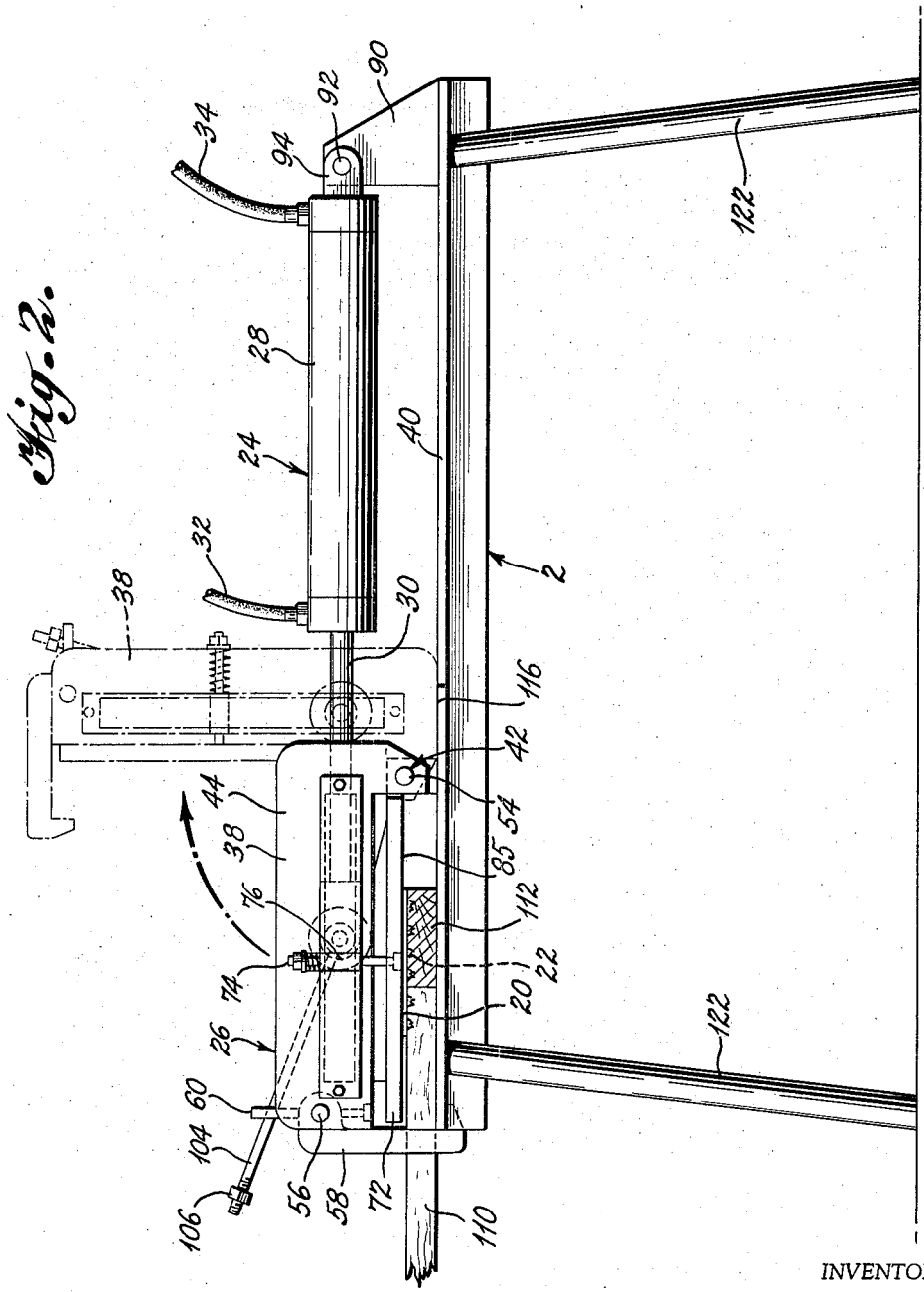

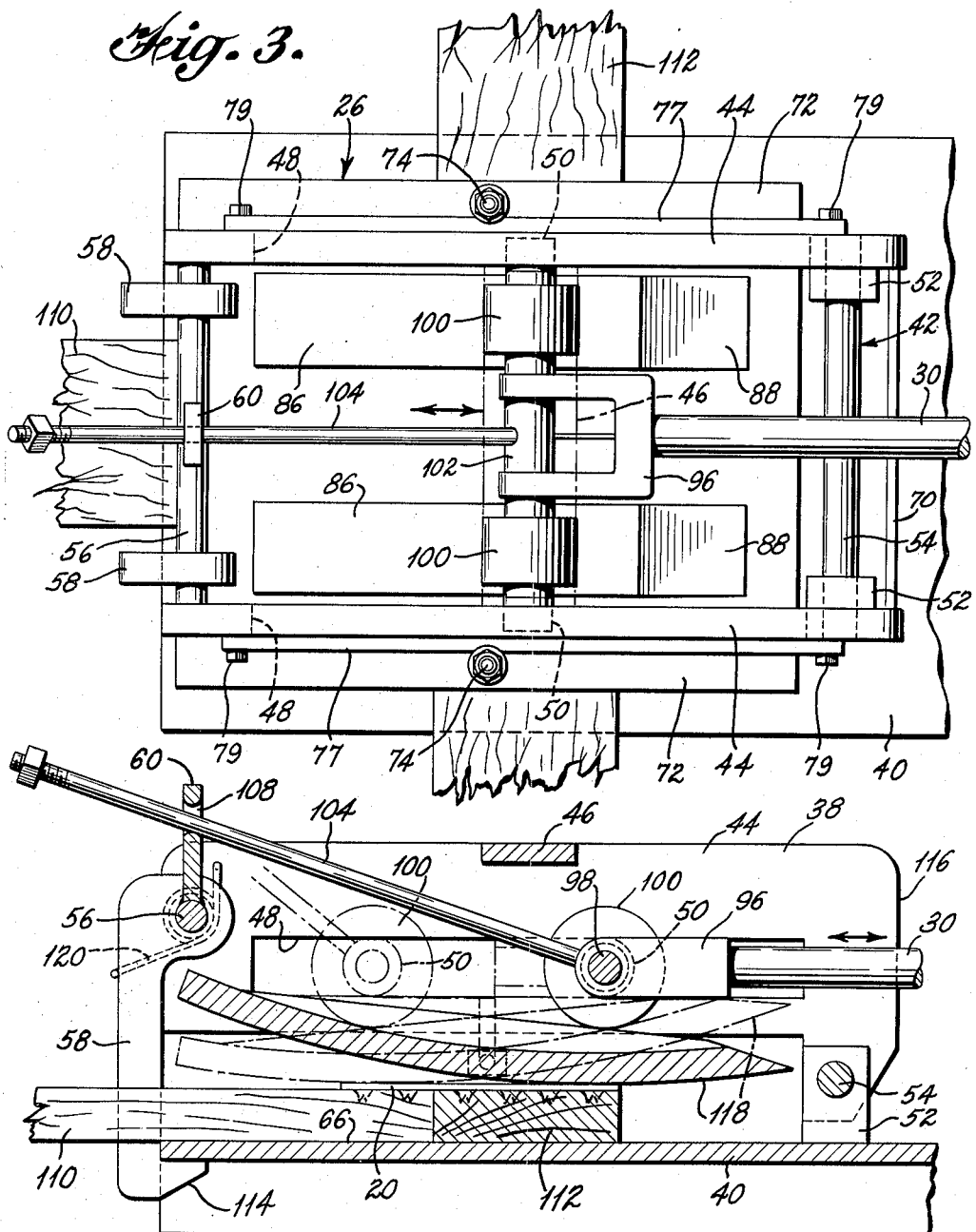

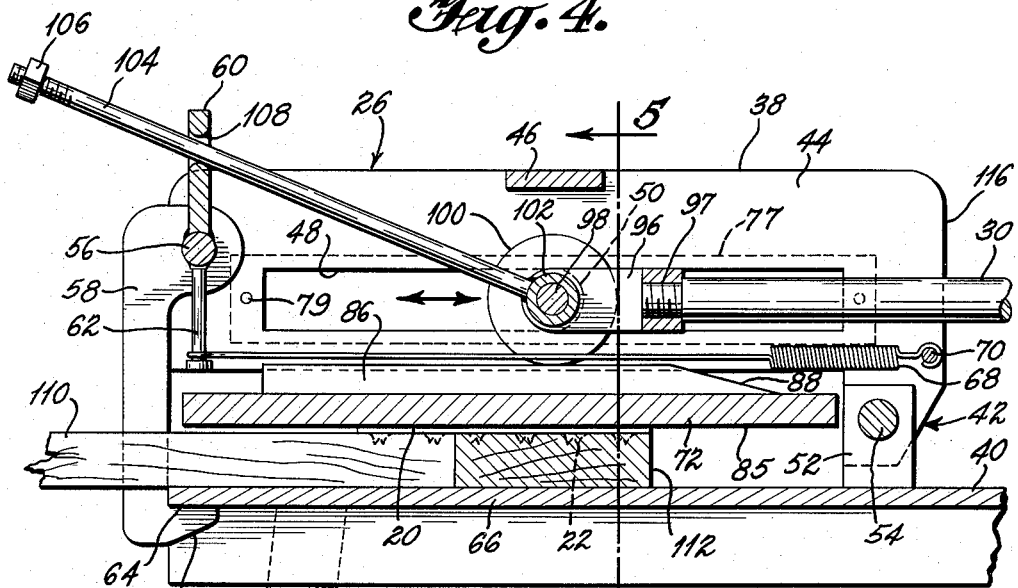
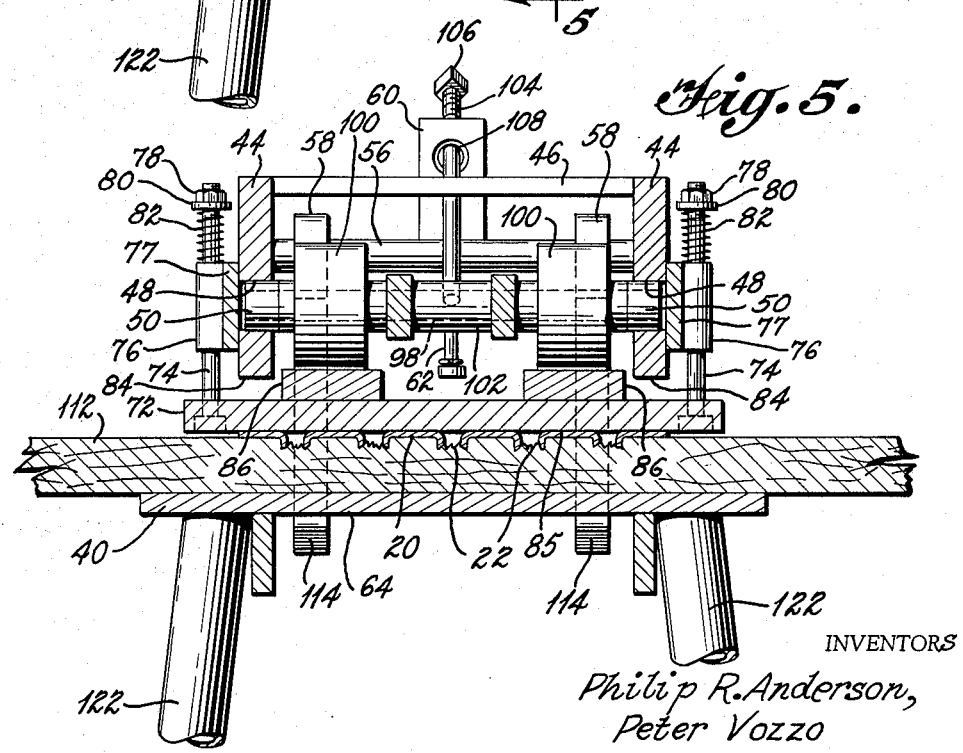

April 5, 1966 P. R. ANDERSON ETAL 3,244,091
WEDGE PRESS AND TRUSS MAKING MACHINE
Filed Sept. 4, 1964 6 Sheets-Sheet 5

INVENTORS
Philip R. Anderson,
Peter Vozzo
BY Stevens, Davis, Miller & Mosher
ATTORNEYS April 5, 1966     P. R. ANDERSON ETAL     3,244,091
WEDGE PRESS AND TRUSS MAKING MACHINE Filed Sept. 4, 1964     6 Sheets-Sheet 6

INVENTORS
Philip R. Anderson,
Peter Vozzo
Stevens, Davis, Miller & Mosher
ATTORNEYS

United States Patent Office

3,244,091
Patented Apr. 5, 1966

3,244,091
WEDGE PRESS AND TRUSS MAKING MACHINE
Philip R. Anderson and Peter Vozzo, both of
P.O. Box 130, Easton, Md.
Filed Sept. 4, 1964, Ser. No. 394,513
6 Claims. (Cl. 100—214)

This invention relates to presses, and more particularly to presses employing hydraulically actuated force multiplying means.

While the presses of the present invention are useful in performing many known pressing operations, they have particular utility in the manufacture of roof trusses.

The building industry is constantly seeking ways and means to reduce the cost, and speed the construction of buildings. The use of pre-assembled parts helps attain both ends. However, the pre-assembled parts must themselves be assembled to given specifications and must also conform to the pattern of reduced cost and speed of assembly. It is to this problem that this invention is directed.

Pre-assembled roof trusses are now a very important factor in building construction. The home building industry uses great numbers of pre-assembled wood trusses which are of different design for different homes, and while a number of trusses used in each home are the same, the difference in the trusses for different homes is a factor which complicates the cost problem.

It is therefore an object of this invention to provide a machine for use in the manufacture of wooden roof trusses which can be readily adapted for the manufacture of wooden roof trusses of different design.

It is a further object of this invention to provide presses of novel construction employing force multiplying means which can be used alone or in multiple.

A further object of this invention is to provide presses which are automatic and safe and which require the use of a minimal labor force for operation.

Another object of this invention is to provide novel means for discharging the assembled truss from the truss making machine.

The invention will be understood from the following detailed description when read in conjunction with the accompanying drawings wherein like numerals are used to designate like parts in the several views and wherein:

FIGURE 2 is a side view of one embodiment of a press made in accordance with this invention;

FIGURE 3 is a plan view of the press shown in FIGURE 2 with some parts omitted;

FIGURE 4 is a side view partly in section of the press of FIGURE 2 with some parts omitted;

FIGURE 5 is a vertical sectional view taken on the line 5—5 of FIGURE 4;

FIGURE 6 is a side view partly in section of a modification of the press with parts omitted;

Figure 1:
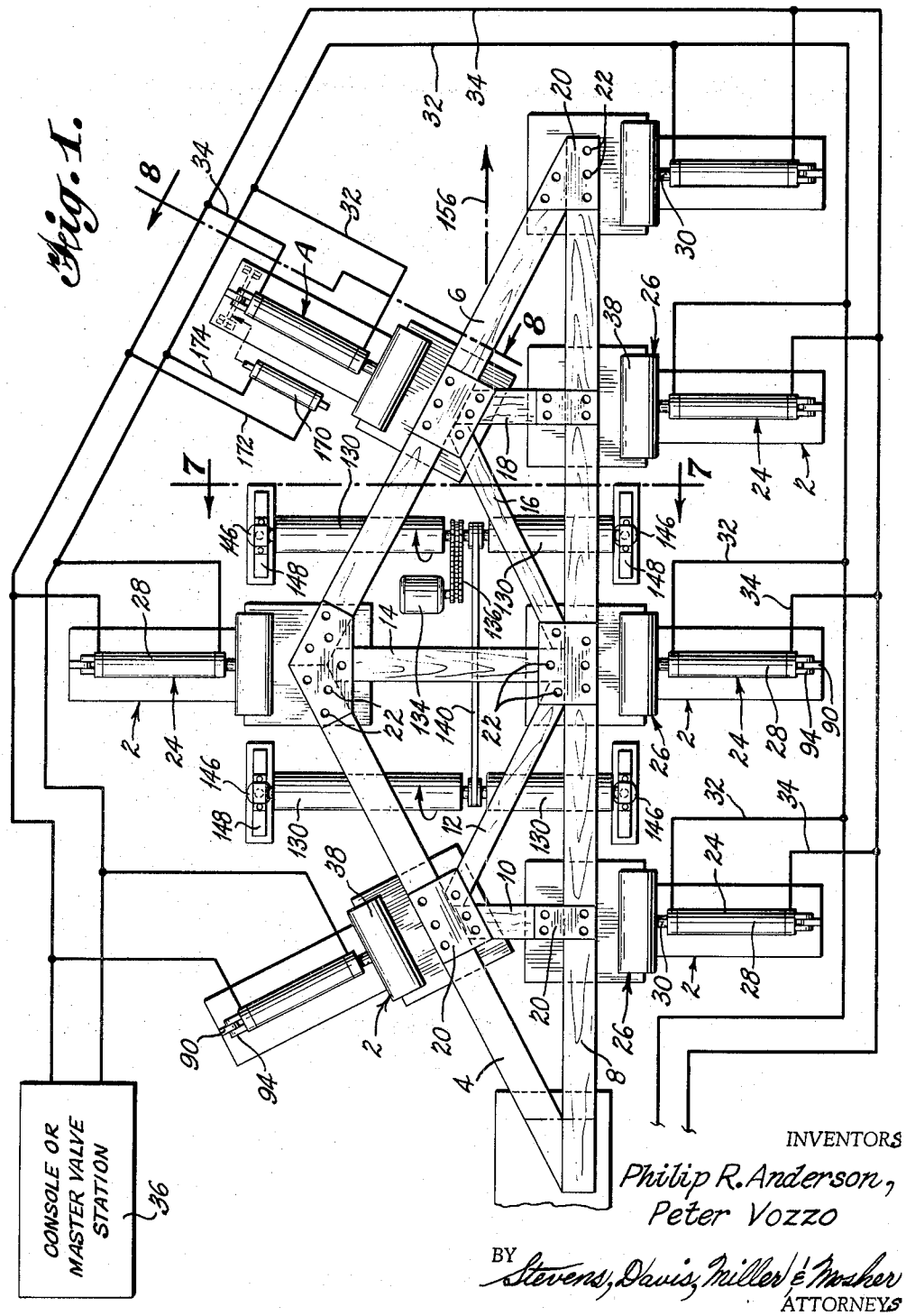
FIGURE 1 shows in plan view the general organization of a truss making machine.

In FIGURE 1 there is shown a roof truss making machine comprising a plurality of presses 2 arranged in a pattern for simultaneously securing the individual members of the truss together. The particular truss shown in the drawing is a truss in common use and comprises sloping top chords 4 and 6, a bottom tension member 8, and bracing members 10, 12, 14, 16 and 18. The members of the truss are secured together by butt joints and splice plates 20. The splice plates are metal members which are perforated to provide elongated rims with jagged edges such as shown at 22 in FIGURES 4 and 5 and which serve the function of nails. By pressing the portions 22 into the wood the individual members of the truss are securely and permanently joined. It is to be understood that the plates are preferably used in pairs, one on each side of the joint.

The indiivdual presses are located at each joint, as dictated by the truss design, and for purposes of description are shown arranged in the necessary pattern to assemble the truss illustrated in FIGURE 1. The individual members of the truss are precut and arranged as shown to present each joint of the truss to a press. The splice plates 20 are merely laid over each joint and the presses can be operated simultaneously, in a manner explained below, to force rims 22 into the wood. If companion plates 20 are laid under each joint while assembling the individual members of the truss on the presses, the single operation of the presses completes the truss assembly. If companion plates 20 are omitted the partially assembled truss is sufficiently rigid to be turned over and the companion plates supplied in a separate operation.

Although plates 20 are shown as supplied with a few rims 22 and member 14 is shown as secured by a single rim 22, it is pointed out that this is merely for purposes of diagrammatic illustration and that a sufficient number of rims is supplied to allow for a safe, rigid, and permanent assembly.

In use, a single workman can lay each of the members of the truss on the beds of the presses which have been arranged in a selected pattern. If desired, suitable fixtures can be supplied to help in this operation. Plates 20 can be laid in position by the same worker who can then operate all the presses simultaneously from a master valve station 36 which is located a safe distance from the presses.

Each press comprises a power system shown as a hydraulic ram 24 connected to operate a pressure applying section 26 which is more fully explained below. Each ram comprises a piston reciprocally mounted in a cylinder 28 and connected to section 26 by a piston rod 30. Each end of cylinder 28 is connected to a source of pressure fluid (not shown) by fluid conduits 32 and 34 and the console or master valve station 36. By operating the master valve in the console, fluid can be supplied to the same end of all the cylinders simultaneously while allowing escape of the fluid from the other end of the cylinders.

The pressure applying section 26 comprises a frame 38 pivotally mounted at one end on the support 40 by a pivotal arrangement 42 for pivotal movement between the solid line and dot-dash line positions shown in FIGURE 2.

Referring to FIGURES 3 to 6, the frame 38 comprises spaced plates 44 secured together by braces 46 welded thereto, only a single brace being shown to provide for simplicity of illustration. Each plate is provided with an elongated slot 48 to provide a trackway for rollers 50, the end walls of the trackways defining abutments for a purpose to be explained below.

The pivotal arrangement 42 comprises spaced ears 52 secured to support 40 as by welding and having fixed therein a rod 54 having overhanging ends on which are pivotally mounted the plates 44.

A shaft 56 is rotatably mounted in plates 44 at the other end of the frame. A hook member 58 is mounted on and secured to shaft 56 adjacent each plate 44 and an arm 60 is secured to the shaft at the center thereof. An arm 61 is secured to shaft 56 opposite arm 60.

In the pressing position hook members 58 engage an undersurface 64 of the support 40 to lock the frame against pivotal movement away from the bed. The upper surface 66 of support 40 constitutes the press bed. A tension spring 68 (FIG. 4) is secured to arm 62 and to a rod 70 to urge the hooks into locking engagement and to oppose any tendency for the hooks to disengage under load. The rod 70 is secured to side plates 44 as by welding to thereby serve as an additional brace.

A platen 72 is mounted on the frame for limited universal tilting and reciprocating movement thereon. For this purpose bolts 74 are secured to opposite sides of the platen and extend through ears 76 which are shown integral with a cover plate 77 secured to the frame by bolts 79 (FIG. 3). The bolts 74 have a loose fit in the ears. The bolts are supplied with nuts 78 and washers 80 to serve as an abutment for compression springs 82 which function to hold the platen against surfaces 84 of plates 44 in the absence of any load on the platen.

One surface 85 of the platen is flat to engage with the plates 20. The opposite surface is provided with spaced trackways 86 connected to the surface by ramps 88.

As shown in FIGURE 2, the cylinder 28 is pivotally mounted on the support 40 by an ear 90 secured to the support as by welding and a pin 92 extending through said ear and a pair of spaced ears 94 secured to the cylinder. The piston rod 30 is secured to a carriage 96 as by being threaded therein as shown at 97 (FIG. 4). A shaft 98 is fixedly mounted in the legs of the U-shaped carriage. Rollers 100, which are preferably well known anti-friction roller bearings, are mounted on the shaft in position to roll on trackways 86 and rollers 50 are mounted on the shaft in position to roll in trackways 48.

A sleeve element 102 is pivotally mounted on shaft 98 and has secured thereto as by welding or threading a rod 104 having a head 106 secured at the end thereof. The head is preferably a nut threaded on the end thereof. The rod extends through an opening 108 in arm 60 to provide a lost motion connection.

In operation the elements to be secured together such as shown at 110 and 112 are laid on the bed and plate 20 laid over the joint formed by butting the members together. This operation is performed while the frame 38 is held in the loading position shown in dot-dash lines in FIGURE 2. Operation of the hydraulic ram moves piston rod 30 and thereby the carriage and rollers to the left as seen in FIGURES 2, 3 and 4. This causes rollers 50 to press on trackway 48 to pivot the frame 38 counterclockwise about rod 54 toward the solid line position. As the hooks are carried toward the locking position the bevel surfaces 114 contact the press bed and wedge the hooks 58 clockwise about the center line of shaft 56 against the force of spring 68 until the hooks pass the end of the bed and engage the surface 64. Continued movement of the carriage moves rollers 100 up the ramps 88 and along the trackway 86 to force the splice plate 20 and rims 22 into securing engagement with wood elements 110, 112. The reaction force produced by the pressure of rollers 100 is taken up by rollers 50 bearing against the upper surfaces of trackways 48 and by the hooks 58.

Upon completion of the pressing operation, the control valve is operated to return the piston rod, carriage, and rollers to the right as seen in FIGURES 2, 3 and 4. Toward the end of the return stroke head 106 is brought into contact with arm 60 to pivot the hooks 58 clockwise about the center line of shaft 56 and out of locking engagement with surface 64. The positioning of the head 106 on the rod can be varied to adjust the amount of lost motion before engagement with the arm 60 and the unlocking of the frame from the bed. Continued movement toward the right brings rollers 50 into engagement with the ends of the trackways 48 which function as abutments to initiate the pivoting movement of the frame clockwise about rod 54. The upper surfaces of trackways 48 also operate as abutments for rollers 50 after the pivoting motion begins. Upon return of the frame to the dot-dash line or loading position as shown in FIGURE 2, the end surfaces 116 engage the upper surface of the support 40 to stop further movement. If desired, an adjustable stop could be used in lieu of the surface of the support.

The support 40 is provided with legs 122 to maintain the support surface at a convenient height and to permit mobility to allow for movement into selected patterns when used in multiple. Although each press is shown as supported on legs, it is within the scope of the invention to provide other mounting means for the purposes of adjustability into various patterns.

Figure 7:
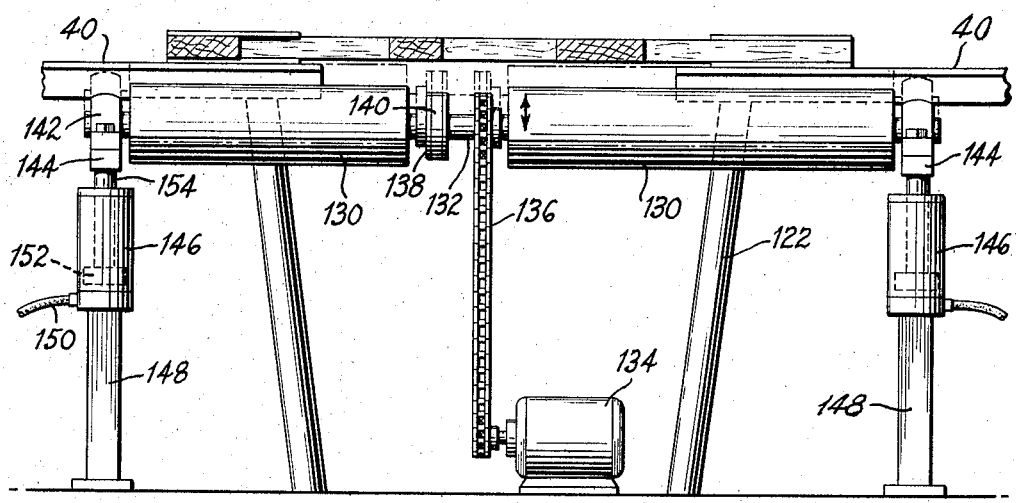
FIGURE 7 is an elevational view taken on line 7—7 of FIGURE 1 of a roller mechanism for discharging the truss from the truss making machine.
Figure 8:
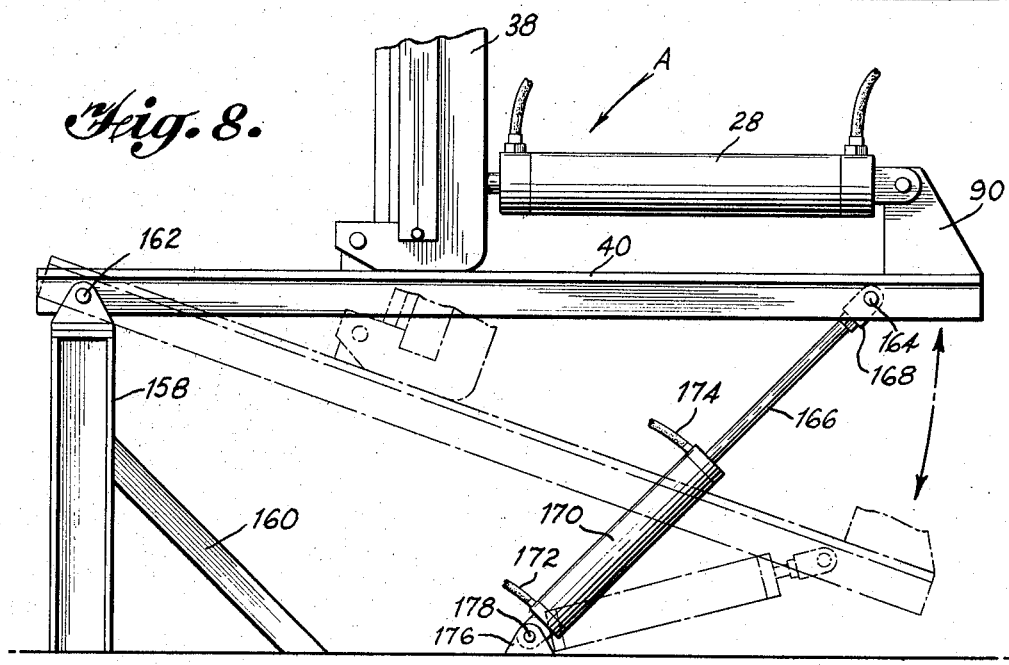
FIGURE 8 is an elevational view taken on line 8—8 of FIGURE 1 of a press with some parts omitted mounted on a support which may be pivoted to an inoperative position when the truss is to be discharged.

With the foregoing explanation of the structure and mode of operation of each press in mind; the discharge of a finished truss from the machine will now be described with reference to FIGURES 1, 7 and 8. As the individual presses are pivoted to their inoperative positions as described above, two pairs of elongated discharge rollers 130 are elevated to contact the lower surface of the truss. The rollers 130 of each pair are connected by a drive shaft 132 which is driven by motor 134 and a conventional chain drive 136. Each pair of rollers is driven in unison by way of pulleys 138 and V belt 140 as illustrated in FIGURE 1. The outer ends of drive shafts 132 are rotatably received within bearings 142 which are mounted in a conventional manner within vertical supports 144.

Rollers 130 are elevated by hydraulic cylinders 146 which are mounted on standards 148 and are supplied with hydraulic fluid via lines 150 to elevate pistons 152 and the associated piston rods 154. The upper ends of piston rods 154 are threaded or otherwise rigidly secured to supports 144. The fluid supplied to lines 150 is preferably from the same source as that employed to actuate the presses. To lower the rollers 130, the hydraulic fluid is withdrawn through lines 150 and the rollers and associated structure will drop by gravity to inoperative positions.

It will be appreciated that with rollers 130 rotating clockwise as shown in FIGURE 1, this movement when transmitted to the press will tend to discharge the truss in the direction of arrow 156. In order to permit unimpeded discharge of the truss, the press designated by letter A has its horizontal support 40 mounted to be pivoted downwardly to the dot-dash position shown in FIGURE 8 whereupon it is out of the path of travel of the truss. One end of support 40 is pivotally secured by a pin 162 to a suitable standard 158 which may be provided with a brace 160. A rod 164 at the other end of frame 40 is pivotally connected to a piston rod 166 by an ear 168 which may be threaded to the upper end of the piston rod. The piston rod is actuated by a hydraulic cylinder 170 which is supplied and vented of hydraulic fluid in conventional manner via lines 172 and 174. The lower end of hydraulic cylinder 170 is secured in any known manner, for example, by way of a pair of ears 176 which are anchored to the floor and a pin 178 which enables the cylinder to be pivoted with respect to the ears.

The elevation and actuation of rollers 130 and the lowering of the press A are preferably carried out at the end of the pressing cycle as hydraulic rams 24 are retracting the presses. For example, the hydraulic fluid may be supplied via lines 150 to cylinders 146 to elevate the rollers 130, and via line 174 to hydraulic cylinder 170 to lower press A essentially at the same time that hydraulic fluid is supplied through lines 32 to cylinders 28 to open the presses. Motor 134 for actuating the rollers may be started by a microswitch or similar known means. The hydraulic fluid for actuating all of the disclosed hydraulic cylinders is preferably taken from a common source.

In FIGURE 6 there is shown a modification of the press where the lower pressing surface 118 of the platen is arcuate to provide for a more concentrated pressing force. In this modification spring 68 has been replaced by a torsion spring 120 to bias the hooks in the counterclockwise direction.

Figure 9:
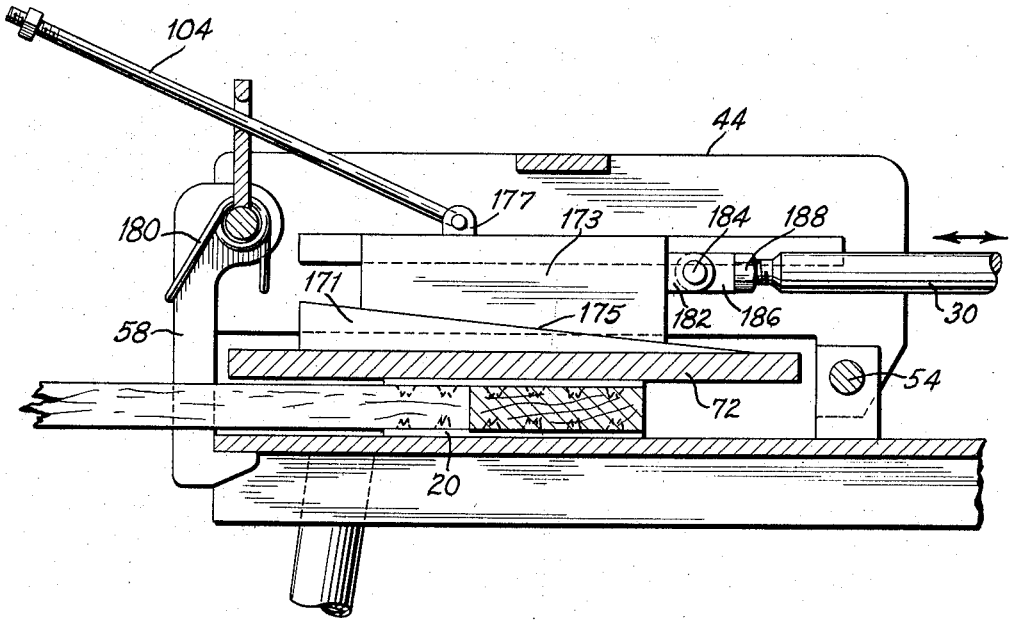
FIGURE 9 is a side view partly in section of a modified press.

FIGURE 9 illustrates another embodiment of the present invention wherein lieu of the rollers and associated trackways of the first embodiment there is provided a pair of cooperating inclined ramps or essentially wedge-shaped members 171 and 173 which transmit the generated pressure to the truss. The lower wedge member 171 is welded or otherwise secured to platen 72 with its inclined surface 175 facing upwardly. It will be seen that the length of inclined surface 175 is greater than that of the cooperating inclined surface of the upper wedge member 173 so that the upper wedge member may be reciprocated along surface 175. A projection 177 on the top surface of wedge member 173 receives the rod 104 of the lost motion mechanism. In this embodiment, a torsion spring 180 is provided to normally urge hook member 58 into its locking position. The upper wedge member 173 is connected to piston rod 30 by a pair of ears 182, pin 184, link 186, and a threaded connection 188. The opening and closing of the press of this embodiment is substantially the same as that described in connection with the previous embodiments.

While preferred embodiments of the present invention have been shown and described, it will be appreciated that modifications may be made therein without departing from the scope and spirit of the invention. Similarly, it is apparent that the various novel features of the present invention may be used alone or in combination. Accordingly, it is intended to encompass all such changes and modifications as fall within the scope of the appended claims.

We claim:

1. A press comprising a bed, a frame pivotally mounted on the bed and normally positioned above the bed, means for locking the frame in pressing position on the bed, means for unlocking and pivoting the frame to a loading position clear of the bed, an arcuate platen pivotally mounted on the frame, and means forcing the platen toward the bed, said last mentioned means including a hydraulically actuated piston rod, a roller connected to said piston rod and positioned to engage the upper surface of the arcuate platen in the pressing position thereof to pivot the arcuate platen with respect to the frame while the platen is in contact with a work piece to vary the point of application of the generated pressure.

2. A press comprising a bed, a frame pivotally mounted on said bed, locking means for locking said frame in pressing position on said bed, pivot means for pivoting the frame to a loading position clear of said bed, a platen mounted on said frame for reciprocating movement thereon, actuating means for forcing said platen towards said bed, and unlocking means for unlocking said frame from said bed comprising an arm secured to said locking means and a lost motion connection between said arm and said actuating means.

3. A press as in claim 2 wherein said lost motion means comprises an opening in said arm and a headed rod secured to said actuating means.

4. A press as in claim 2 wherein said actuating means comprises a first trackway in said frame, a second trackway on one face of said platen, rollers in engagement with said first and second trackways, and means for moving said rollers along said trackways.

5. A press as in claim 4 wherein said means for moving said rollers along said trackways comprises a cylinder pivotally mounted on said bed, a piston reciprocally mounted in said cylinder and a rod connected to said piston and said rollers.

6. A press as in claim 4 wherein said actuating means further comprises an inclined surface forming an entrance to said second trackway, the rollers associated with said second trackway being positioned to roll along said inclined surface.

References Cited by the Examiner

UNITED STATES PATENTS

| | | | |
|---|---|---|---|
| 32,363 | 5/1861 | Heckler | 100—233 X |
| 48,021 | 5/1865 | Lawrence et al. | 100—219 |
| 617,042 | 1/1899 | Phelps | 100—292 X |
| 1,872,692 | 8/1932 | Drake | 100—233 X |
| 2,046,785 | 7/1936 | Malott. | |
| 2,197,195 | 4/1940 | Schemers | 292—128 |
| 2,415,766 | 2/1947 | Shapiro. | |
| 2,996,721 | 8/1961 | Black | 227—152 |
| 3,068,483 | 12/1962 | Moehlenpah et al. | 100—193 |
| 3,068,484 | 12/1962 | Moehlenpah et al. | 227—152 |
| 3,069,684 | 12/1962 | Moehlenpah et al. | 277—152 |
| 3,100,301 | 8/1963 | Black | 227—152 |
| 3,115,085 | 12/1963 | VanDeBilt | 100—7 X |
| 3,172,125 | 3/1965 | Sanford | 227—99 |
| 3,179,037 | 4/1965 | Cranston et al. | 100—7 X |

FOREIGN PATENTS

| | | |
|---|---|---|
| 645,409 | 6/1928 | France. |
| 179,263 | 12/1906 | Germany. |
| 814,097 | 9/1951 | Germany. |

IRVING BUNEVICH, *Primary Examiner.*

BILLY J. WILHITE, *Examiner.*